(12) United States Patent
Jiang et al.

(10) Patent No.: US 12,355,592 B2
(45) Date of Patent: Jul. 8, 2025

(54) ENHANCED TRIGGER-BASED NULL DATA PACKET FOR CHANNEL SOUNDING

(71) Applicant: INTEL CORPORATION, Santa Clara, CA (US)

(72) Inventors: Feng Jiang, Santa Clara, CA (US); Robert Stacey, Portland, OR (US); Jonathan Segev, Sunnyvale, CA (US); Qinghua Li, San Ramon, CA (US); Xiaogang Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/194,439

(22) Filed: Mar. 31, 2023

(65) Prior Publication Data

US 2023/0239178 A1 Jul. 27, 2023

Related U.S. Application Data

(63) Continuation of application No. 17/210,364, filed on Mar. 23, 2021, which is a continuation of application
(Continued)

(51) Int. Cl.
*H04L 25/02* (2006.01)
*H04L 5/00* (2006.01)
(Continued)

(52) U.S. Cl.
CPC ............. *H04L 25/023* (2013.01); *H04L 5/00* (2013.01); *H04L 25/0212* (2013.01);
(Continued)

(58) Field of Classification Search
CPC ............. H04L 25/0212; H04L 25/0228; H04L 25/023; H04L 25/0258; H04L 5/00; H04W 24/10
See application file for complete search history.

(56) References Cited

U.S. PATENT DOCUMENTS

2019/0165883 A1* 5/2019 Chun .................... H04W 84/12
2023/0038212 A1* 2/2023 Chaudhary ......... H04W 64/006

FOREIGN PATENT DOCUMENTS

CN 114401231 A * 4/2022

OTHER PUBLICATIONS

Noction (Network latency and packet loss effects on performance Jan. 16, 2015, https://www.noction.com/blog/network-latency-packet-loss) (Year: 2015).*

* cited by examiner

*Primary Examiner* — Zhensheng Zhang
(74) *Attorney, Agent, or Firm* — Eversheds Sutherland (US) LLP

(57) ABSTRACT

This disclosure describes systems, methods, and devices related to a trigger-based null data packet (NDP) for channel sounding system. A device may send a trigger frame to a group of station devices, the group of station devices including a first station device, the trigger frame indicating a high efficiency (HE) long training field (HE-LTF) mode and a guard interval duration. The device may identify a HE trigger-based (TB) null data packet (NDP) received from the first station device, the HE TB NDP including a first packet extension field, wherein the HE TB NDP is associated with the HE-LTF mode and the guard interval duration indicated in the trigger frame. The device may send a downlink NDP including a second packet extension field, a second HE-LTF mode, and a second guard interval duration. The device may determine channel state information based on HE TB NDP received from the first station device.

18 Claims, 8 Drawing Sheets

Related U.S. Application Data

No. 16/234,217, filed on Dec. 27, 2018, now abandoned.

(60) Provisional application No. 62/629,966, filed on Feb. 13, 2018.

(51) Int. Cl.
*H04W 24/10* (2009.01)
*H04W 74/08* (2009.01)
*H04W 84/12* (2009.01)

(52) U.S. Cl.
CPC ...... *H04L 25/0228* (2013.01); *H04L 25/0258* (2013.01); *H04W 24/10* (2013.01); *H04W 74/08* (2013.01); *H04W 84/12* (2013.01)

240 → | L-STF 242 | L-LTF 244 | L-SIG 246 | RL-SIG 248 | HE-SIG-A 250 | HE-STF 252 | HE-LTF 254 | PE 256 |

FIG. 2B

260 → | L-STF 262 | L-LTF 264 | L-SIG 266 | RL-SIG 268 | HE-SIG-A 270 | HE-STF 272 | HE-LTF 274 |

FIG. 2C

ENHANCED TRIGGER-BASED NULL DATA PACKET FOR CHANNEL SOUNDING

CROSS-REFERENCE TO RELATED APPLICATIONS

This application is a continuation of U.S. Non-Provisional application Ser. No. 17/210,364, filed Mar. 23, 2021, which is a continuation of U.S. Non-Provisional application Ser. No. 16/234,217, filed Dec. 26, 2018, which claims the benefit of U.S. Provisional Application No. 62/629,966, filed Feb. 13, 2018, both disclosures of which is incorporated by reference as if set forth in full.

TECHNICAL FIELD

This disclosure generally relates to systems, methods, and devices for wireless communications and, more particularly, trigger-based null data packet (NDP) for channel sounding.

BACKGROUND

Wireless devices are becoming widely prevalent and are increasingly requesting access to wireless channels. Wireless devices may benefit from evaluating wireless channels.

BRIEF DESCRIPTION OF THE DRAWINGS

FIG. 2B depicts an illustrative high-efficiency sounding null data packet, in accordance with one or more example embodiments of the present disclosure.

FIG. 2C depicts an illustrative high-efficiency trigger-based null data packet, in accordance with one or more example embodiments of the present disclosure.

DETAILED DESCRIPTION

Figure 1:
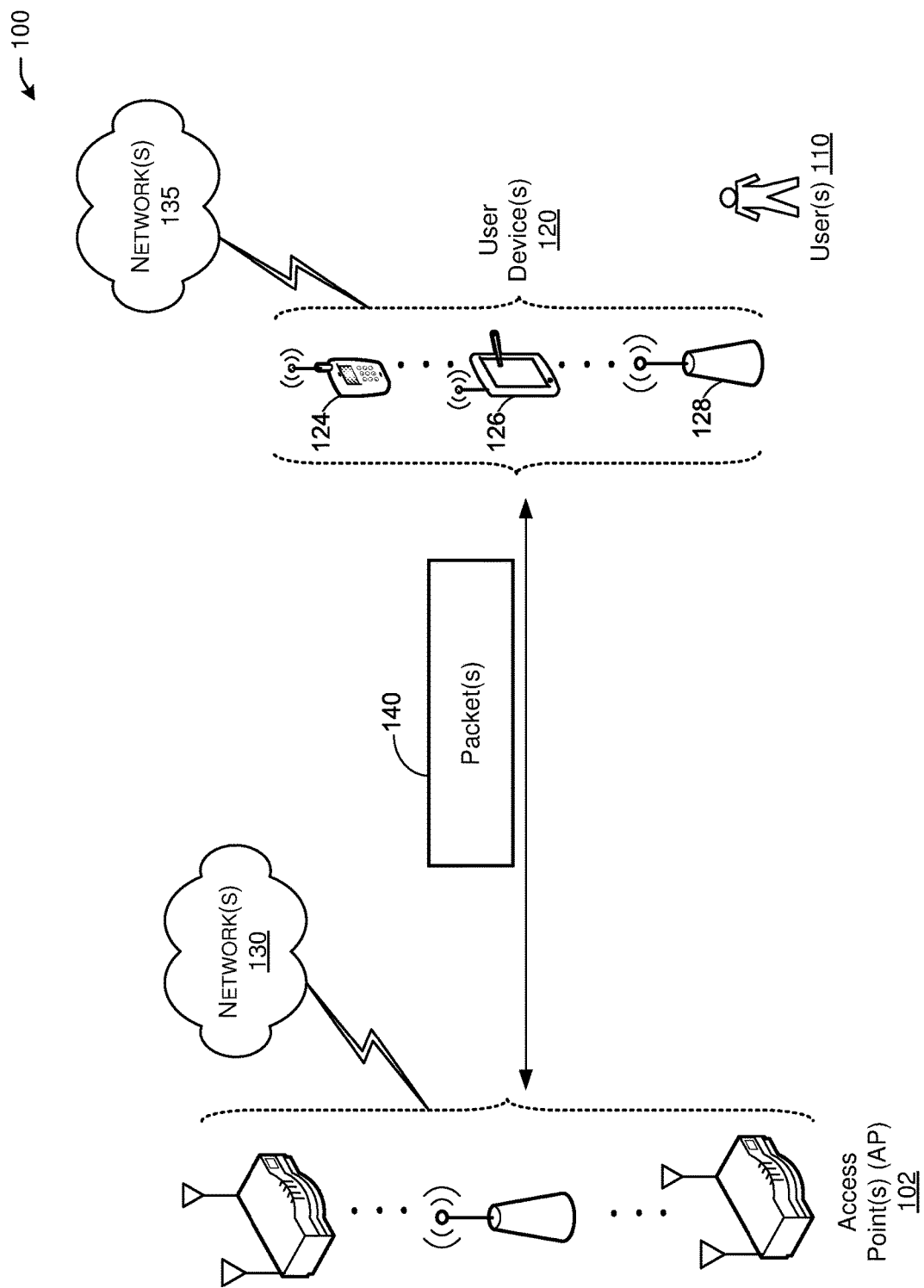
FIG. 1 depicts a diagram illustrating an example network environment, in accordance with one or more example embodiments of the present disclosure.

Example embodiments described herein provide certain systems, methods, and devices, for trigger-based null data packet (NDP) for channel sounding.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In wireless communications, devices may use a variety of methods to determine a device's location/position. For example, devices may exchange data transmissions using a null data packet (NDP) with sequences of symbols. A portion of an NDP frame may include one or more sounding symbols. Each sounding symbol may have a set of subcarriers (e.g., tones) having non-zero energy, and some guard subcarriers such as direct current (DC) subcarriers and edge subcarriers. Based on the symbols in a sounding signal, devices may perform time of arrival estimation (e.g., a time of arrival of a sounding signal at a device), which may be used to determine device's range respective to other devices.

Channel sounding may allow devices to determine the quality and behavior of wireless communication mediums (e.g., channels and/or frequency bands). In a basic channel sounding process, a transmitter may send a sequence to a receiver. The receiver may receive the sequence and, based on the transmitted sequence, may determine an impulse response of a channel between the transmitter and receiver. Due to the effect of an environment (e.g., an area with many people, buildings, objects, etc.), wireless signals may travel in multiple paths between a transmitter and receiver. The paths may be affected by reflection, refraction, scattering, and other factors, which may result in multiple versions of a signal arriving at a receiver at different times. To perform channel sounding, a frame format which uses an entire frequency band may be defined.

In an MU measurement sequence, such as in the IEEE 802.11az Wi-Fi communications standard, a responder (e.g., access point device) may send a trigger frame to solicit uplink (UL) transmissions of sounding frames (e.g., null data packets) from initiators (e.g., station devices). However, the frame format of the UL sounding null data packet (NDP) is not defined yet for MU communications, so initiators in MU sounding operations may not be able to respond to a trigger frame requesting an uplink transmission for use in channel sounding.

Some existing NDP frame formats have been defined, such as a high efficiency (HE) sounding NDP physical layer convergence protocol data unit (PPDU) and a HE trigger-based (TB) NDP feedback PPDU (e.g., as defined in the IEEE 802.11 standards for Wi-Fi communications). The HE sounding NDP PPDU may be used for beamforming purposes in which devices train their respective antennas directionally. For example, after a beamformee device receives a HE sounding NDP, the beamformee may estimate a channel used to send the HE sounding NDP by analyzing the NDP. The analysis may include determining channel state information (CSI). The beamformee device may send the CSI information to a beamformer which sent the HE sounding NDP. The HE NDP PPDU may support multiple HE long training field (HE-LTF) modes and guard intervals. The HE NDP PPDU may include a HE-LTF whose duration is based on an LTF symbol of the HE NDP PPDU and the HE-LTF mode. The guard interval durations supported by the HE NDP PPDU may include 0.8 us, 1.6 us, 3.2 us, and other durations. The HE NDP PPDU may indicate combinations of HE-LTF modes and guard interval durations, for example, using a HE signal-A (HE-SIG-A) field.

A trigger frame sent by an access point (AP) may cause a station device (STA) to send one or more uplink transmissions to the AP, such as a HE TB NDP feedback PPDU. A trigger frame may indicate combinations of HE-LTF modes and guard interval durations. A STA may transmit using assigned tone sets (e.g., frequency tones associated with allocated resource units in a channel/band) to indicate whether the STA has packet in a queue and requests a resource for from an AP for uplink transmission.

However, neither of the above two types of NDPs may be used for the uplink channel sounding because the HE TB NDP feedback PPDU only uses some tones rather than the entire frequency band, and because the HE sounding NDP PPDU is formatted for downlink transmissions and does not provide a long enough HE short training field (HE-STF) for uplink sounding operations.

In particular, if the existing HE sounding NDP PPDU were to be used for MU UL sounding operations, the HE-STF may not allow for proper channel sounding because the HE-STF of the HE sounding NDP PPDU may be 4 us, and MU UL sounding operations may need a longer time (e.g., 8 us) for the HE-STF so that, for example, an AP may receive a UL PPDU and have sufficient information to determine automatic gain control. In addition, the HE sounding NDP PPDU may not have a way to indicate that it is being used for UL sounding. The existing HE TB NDP feedback PPDU may not support a 2×LTF (2× long training field) mode with a duration of 1.6 us, and may be limited to a packet extension of zero when UL sounding may benefit from using both 2×LTF modes, with guard interval durations of 1.6 us, and from using other packet extension lengths. Also, the HE TB NDP feedback PPDU may use an allocated tone set within a frequency band, which may not include the entire band, and therefore the channel sounding using this type of PPDU may not allow for measurements of an entire channel/band.

Therefore, to ease implementation for sounding an entire channel/band, parts of the HE sounding NDP PPDU and the HE TB NDP feedback PPDU may be used to create a TB NDP PPDU for UL channel sounding, with some modifications. By reusing portions of the existing formats, the new frame format for UL sounding may be compatible with existing and new devices.

Example embodiments of the present disclosure relate to systems, methods, and devices for trigger-based NDP for channel sounding.

In one embodiment, a Trigger-based NDP for channel sounding system may define an enhanced frame format for the UL NDP. The enhanced frame format is compatible with the NDP frame format in the current 802.11ax standard. In particular, the enhanced frame format may use a portion of a HE sounding NDP PPDU, but the parameter fields in the HE signature-A (HE-SIG-A) field of the HE sounding NDP PPDU may be set according to a format of a HE-SIG-A field of a HE TB PPDU. The enhanced frame format may use an entire channel or band like the HE sounding NDP PPDU, but modified for an uplink format partially based on the HE sounding NDP PPDU.

In one embodiment, when performing a single user (SU) channel measurement sequence, an initiator device and a responder device may send a HE sounding NDP PPDU to one another, but when the responder sends a HE sounding NDP PPDU, the responder may set a bit (e.g., bit B0) of a HE-SIG-A1 field to zero to indicate that the HE sounding NDP PPDU is a HE TB PPDU.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 is a diagram illustrating an example network environment, in accordance with one or more example embodiments of the present disclosure. Wireless network 100 may include one or more user devices 120 and one or more access point(s) (AP) 102, which may communicate in accordance with IEEE 802.11 communication standards. The user device(s) 120 may be mobile devices that are non-stationary (e.g., not having fixed locations) or may be stationary devices.

Figure 5:
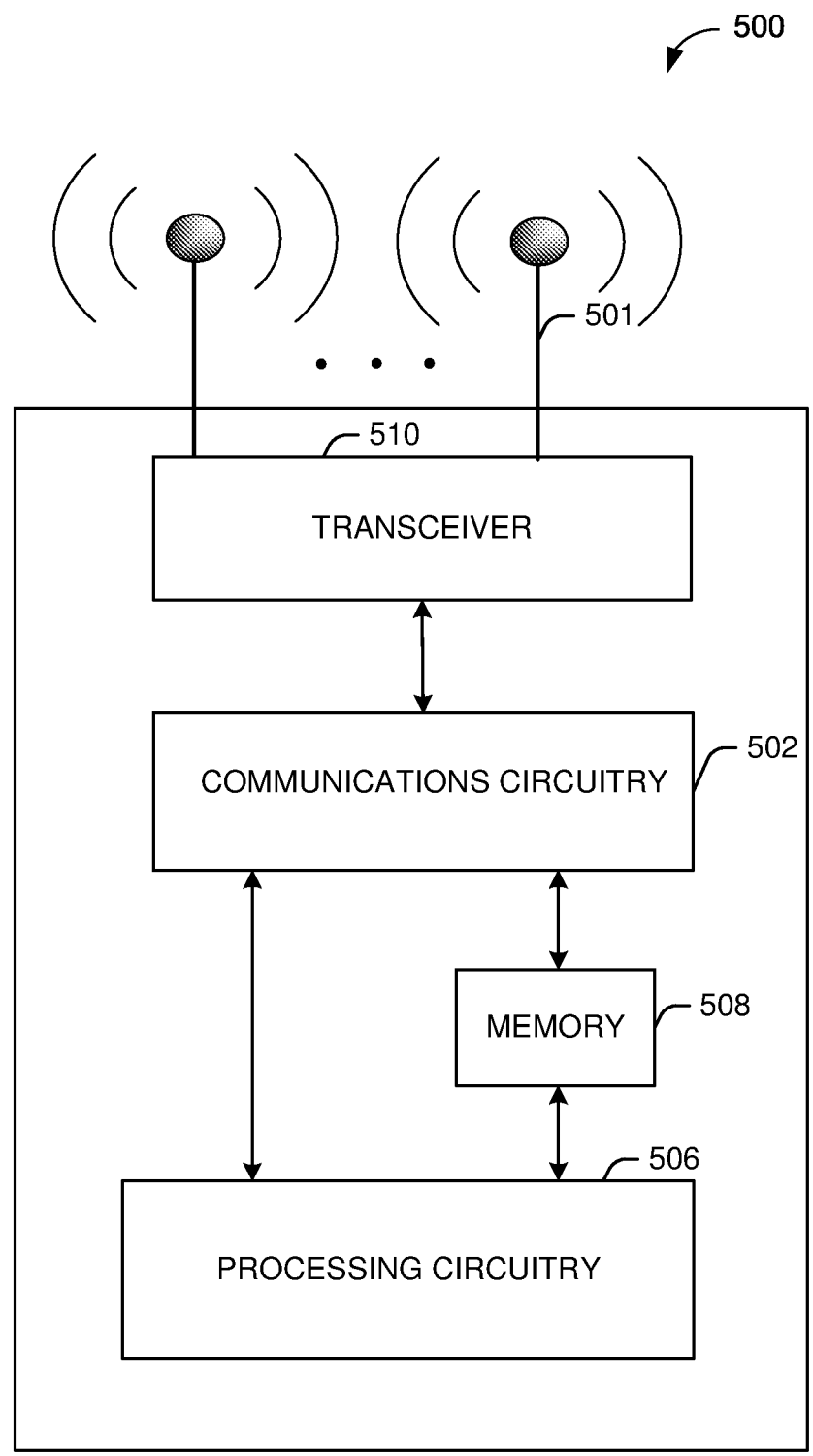
FIG. 5 depicts a functional diagram of an example communication station, in accordance with one or more example embodiments of the present disclosure.
Figure 6:
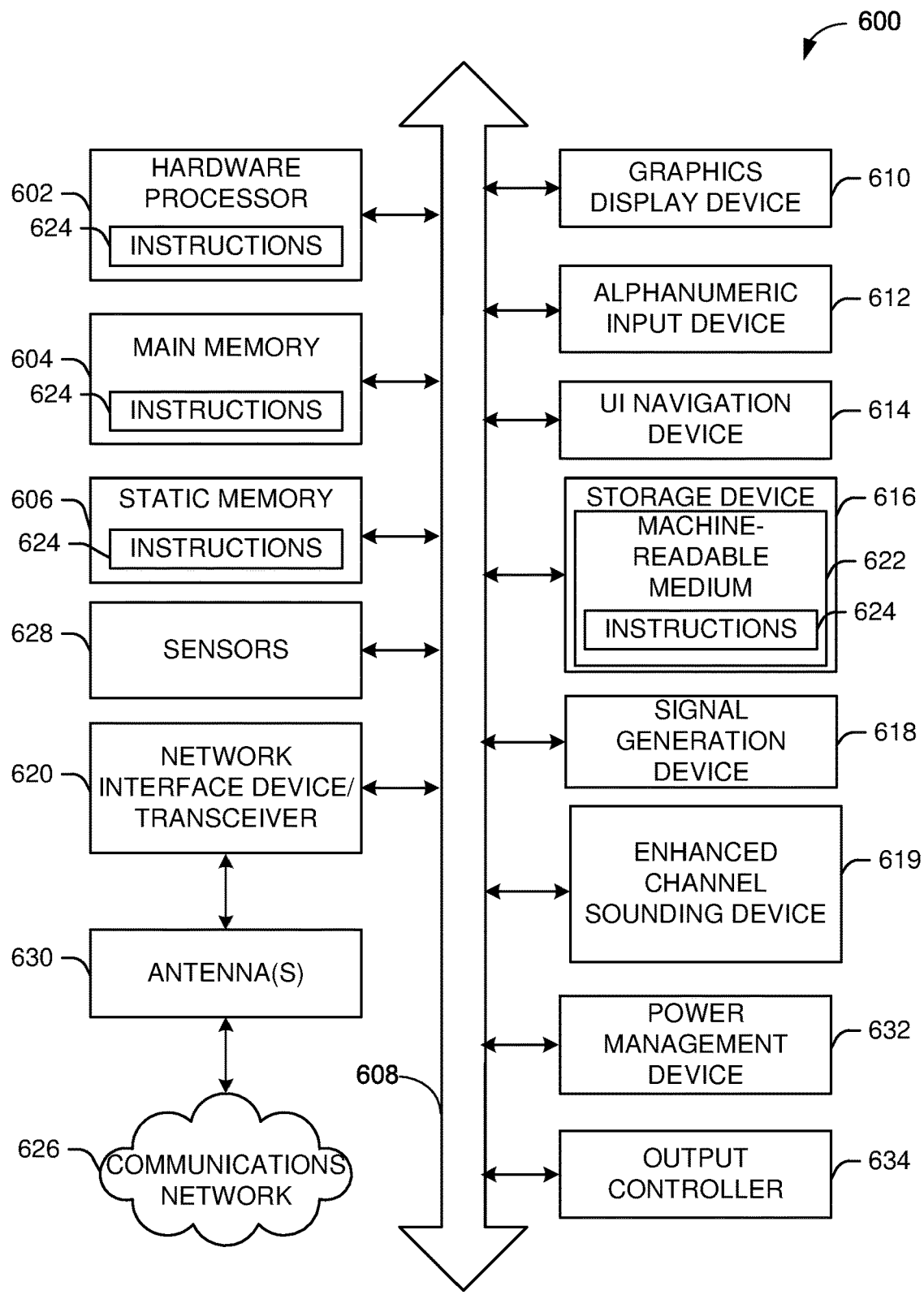
FIG. 6 depicts a block diagram of an example machine upon which any of one or more techniques (e.g., methods) may be performed, in accordance with one or more example embodiments of the present disclosure.

In some embodiments, the user devices 120, and the AP(s) 102 may include one or more computer systems similar to that of the functional diagram of FIG. 5 and/or the example machine/system of FIG. 6.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile Internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards.

Some embodiments may be used in conjunction with devices and/or networks operating in accordance with existing. Wireless Fidelity (Wi-Fi) Alliance (WFA) Specifications, including Wi-Fi Neighbor Awareness Networking (NAN) Technical Specification (e.g., NAN and NAN2) and/or future versions and/or derivatives thereof, devices and/or networks operating in accordance with existing WFA Peer-to-Peer (P2P) specifications and/or future versions and/or derivatives thereof, devices and/or networks operating in accordance with existing Wireless-Gigabit-Alliance (WGA) specifications (Wireless Gigabit Alliance, Inc. WiGig MAC and PHY Specification) and/or future versions and/or derivatives thereof, devices and/or networks operating in accordance with existing IEEE 802.11 standards and/or amendments (e.g., 802.11b, 802.11g, 802.11n, 802.11ac, 802.11ax, 802.11ad, 802.11ay, 802.11az, etc.).

In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, a user device 120 may be in communication with one or more APs 102.

For example, one or more APs 102 may perform MU channel sounding or SU channel sounding with the user device(s) 120. The one or more APs 102 and the user device(s) 120 may exchange packets 140. The packets 140 may include trigger frames, HE NDP PPDUs, HE trigger-based NDP feedback PPDUs, enhanced HE trigger-based PPDUs, NDP announcement (NDPA) frames, channel information/measurement feedback frames, and other frames which may facilitate channel sounding operations.

Figure 2A:
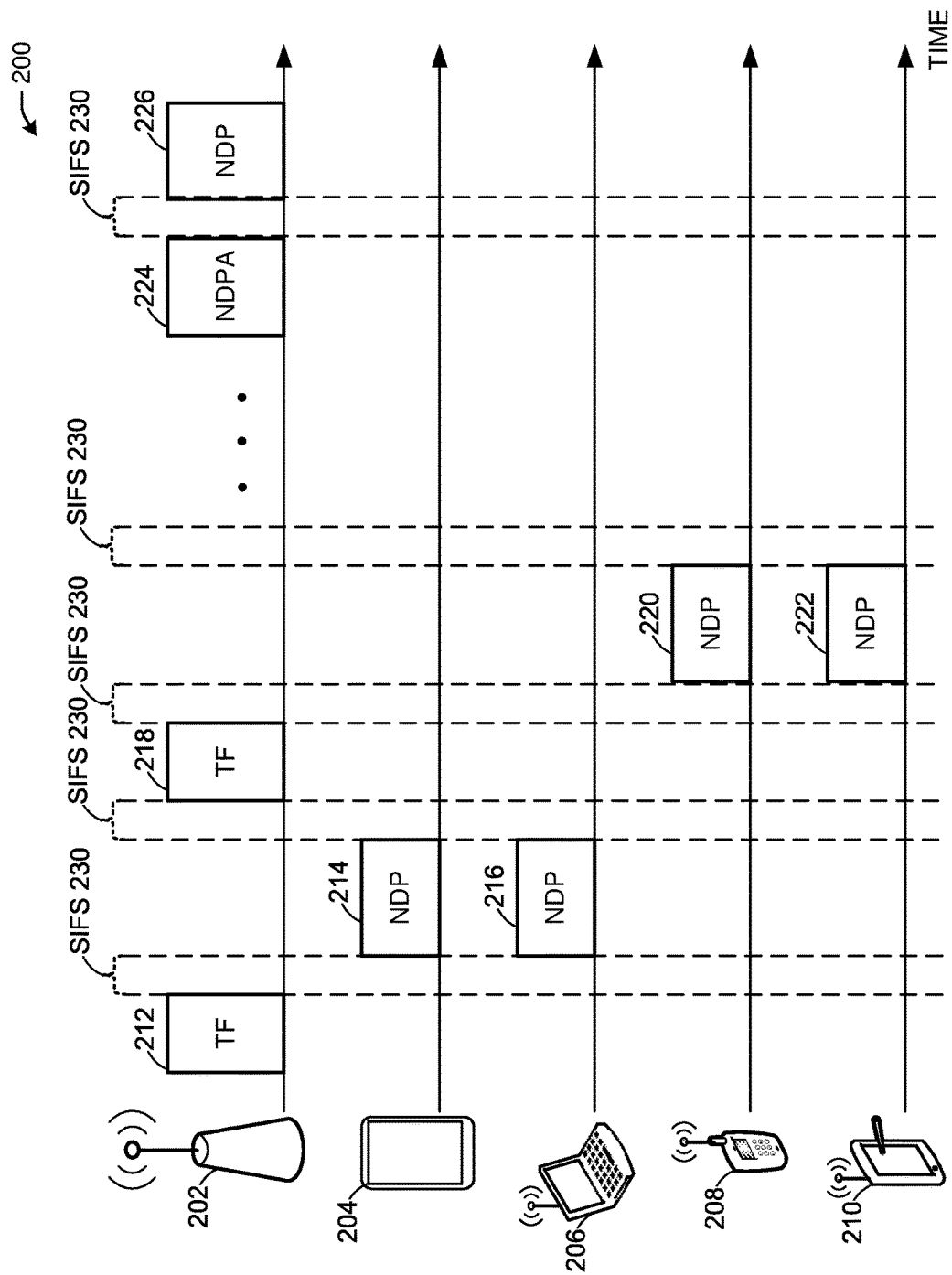
FIG. 2A depicts an illustrative multi-user measurement sequence, in accordance with one or more example embodiments of the present disclosure.

FIG. 2A depicts an illustrative multi-user measurement sequence 200, in accordance with one or more example embodiments of the present disclosure.

Referring to FIG. 2A, the sequence 200 may include a MU measurement sequence such as defined by the IEEE 802.11az communication standard. A responder AP 202 may perform sounding operations with a first group of initiators (e.g., initiator 204, initiator 206) and a second group of initiators (e.g., initiator 208, initiator 210). The responder AP may send a trigger frame 212 to solicit UL sounding NDPs from the first group of initiators. For example, the trigger frame 212 may identify the first group of initiators. The initiator 204 may send a UL NDP 214 to the responder AP 202. The initiator 206 may send a UL NDP 216 to the responder AP 202. The responder AP 202 may send a trigger frame 218 addressed to the second group of initiators. The initiator 208 may send a UL NDP 220 to the responder AP 202. The initiator 210 may send a UL NDP 222 to the responder AP 202. The responder AP 202 may send additional trigger frames to other groups of initiators and may receive respective UL NDPs in response. After the initiators have sent UL NDPs triggered by trigger frames sent by the responder AP 202, the responder AP 202 may send an NDPA 224 indicating a subsequent transmission, and subsequently may send a NDP 226.

The trigger frames sent by the responder AP 202 may indicate that they are trigger frames for UL NDPs so that the initiators provide the UL NDPs to the responder AP 202. The NDP 226 may use a frame format for a HE NDP PPDU, however, the frame format for the UL NDPs may need to be defined and enhanced to allow a longer HE-STF field for sounding, and to support multiple HE-LTF modes and guard interval durations.

The MU measurement sequence 200 may be completed within a single transmission opportunity (TXOP). For example, after any frame is sent, the AP 202 and any of the user devices may wait a time, such as a short inter-frame space (SIFS) 230, before sending a subsequent frame.

FIG. 2B depicts an illustrative HE sounding NDP 240, in accordance with one or more example embodiments of the present disclosure.

Referring to FIG. 2B, the HE sounding NDP 240 may include one or more fields, such as a legacy short training field (L-STF) 242, a legacy long training field (L-LTF) 244, a legacy signal field (L-SIG) 246, a repeated legacy signal field (RL-SIG) 248, a HE-SIG-A field 250, a HE short training field (HE-STF) 252, a HE long training field (HE-LTF) 254, and a packet extension (PE) field 256. The L-STF field 242 may have a length of 8 us. The L-LTF field 244 may have a duration of 8 us. The L-SIG field 246 may have a duration of 4 us. The RL-SIG field 248 may have a duration of 4 us. The HE-SIG-A field 250 may have a duration of 8 us. The HE-STF field 252 may have a duration of 4 us. The HE-LTF field 254 may have a duration of 7.2 us or 8 us per HE-LTF symbol when using a 2×HE-LTF mode, and may have a duration of 16 us per HE-LTF symbol when using a 4×HE-LTF mode. The PE field 256 may have a duration of 4 us.

NDP may be a HE sounding format. The number of HE-LTF symbols in the HE sounding NDP 240 may be determined by a sub-field of the HE-SIG-A field 250 indicating a number of spatial streams (e.g., allocated to one or more users). The HE sounding NDP 240 may use a HE SU PPDU format, but without a data field, and may use the PE field 256 of 4 us. The HE sounding NDP 240 may support a 2×HE-LTF mode with a guard interval of 0.8 us, a 2×HE-LTF mode with a guard interval of 1.6 us, and a 4×HE-LTF mode with a guard interval of 3.2 us.

FIG. 2C depicts an illustrative HE trigger-based NDP 260, in accordance with one or more example embodiments of the present disclosure.

Referring to FIG. 2C, the HE trigger-based NDP 260 may include one or more fields, such as a legacy short training field (L-STF) 262, a legacy long training field (L-LTF) 264, a legacy signal field (L-SIG) 266, a repeated legacy signal field (RL-SIG) 268, a HE-SIG-A field 270, a HE short training field (HE-STF) 272, and a HE long training field (HE-LTF) 274. The L-STF field 262 may have a length of 8 us. The L-LTF field 264 may have a duration of 8 us. The L-SIG field 266 may have a duration of 4 us. The RL-SIG field 268 may have a duration of 4 us. The HE-SIG-A field 270 may have a duration of 8 us. The HE-STF field 272 may have a duration of 8 us. The HE-LTF field 274 may have a duration based on two HE-LTF symbols with 16 us per symbol using the 4×HE-LTF mode.

The HE trigger-based NDP 260 may include NDP feedback report information. The HE trigger-based NDP 260 may use a HE trigger-based PPDU format without a data field and with a PE duration of zero (e.g., no PE field). The HE trigger-based NDP 260 may have two 4×HE-LTF mode symbols, and may support only the 4×HE-LTF mode and guard interval duration.

Figure 3A:
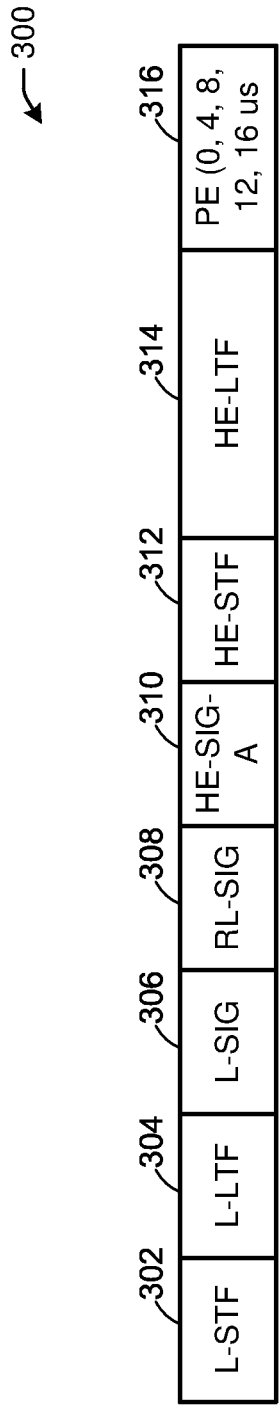
FIG. 3A depicts an illustrative enhanced high-efficiency trigger-based null data packet, in accordance with one or more example embodiments of the present disclosure.

FIG. 3A depicts an illustrative enhanced HE trigger-based NDP 300, in accordance with one or more example embodiments of the present disclosure.

Referring to FIG. 3A, the enhanced HE trigger-based NDP 300 may include one or more fields, such as a legacy short training field (L-STF) 302, a legacy long training field (L-LTF) 304, a legacy signal field (L-SIG) 306, a repeated legacy signal field (RL-SIG) 308, a HE-SIG-A field 310, a HE short training field (HE-STF) 312, a HE long training field (HE-LTF) 314, and a packet extension (PE) field 316. The L-STF field 302 may have a length of 8 us. The L-LTF field 323040 may have a duration of 8 us. The L-SIG field 306 may have a duration of 4 us. The RL-SIG field 308 may have a duration of 4 us. The HE-SIG-A field 310 may have a duration of 8 us. The HE-STF field 312 may have a duration of 8 us. The HE-LTF field 314 may have a duration of 7.2 us or 8 us per HE-LTF symbol when using a 2×HE-LTF mode, and may have a duration of 16 us per HE-LTF symbol when using a 4×HE-LTF mode. The PE field 256 may have a duration of 0, 4, 8, 12, or 16 us, or another duration.

The enhanced HE trigger-based NDP 300 may use the same frame structure (e.g., the same fields) as the HE sounding NDP 240 of FIG. 2B, however the duration of the HE-STF field 312 may have a duration of 8 us, and parameters of the HE-SIG-A field 310 may be different from parameters of the HE-SIG-A field 250 of FIG. 2B, and may be based on the HE-SIG-A field 270 of the HE trigger-based NDP 260 of FIG. 2C. Unlike the HE trigger-based NDP 260 of FIG. 2C, the enhanced HE trigger-based NDP 300 may include a PE field (e.g., PE field 316), which may be longer than zero.

The enhanced HE trigger-based NDP 300 may support the 2×HE-LTF with a guard interval duration of 0.8 us, the 2×HE-LTF mode with a guard interval duration of 1.6 us, and the 4×HE-LTF mode with a guard interval duration of 3.2 us. Thus, the enhanced HE trigger-based NDP 300 may enhance the HE trigger-based NDP 260 by supporting additional HE-LTF modes and including a PE.

Figure 3B:
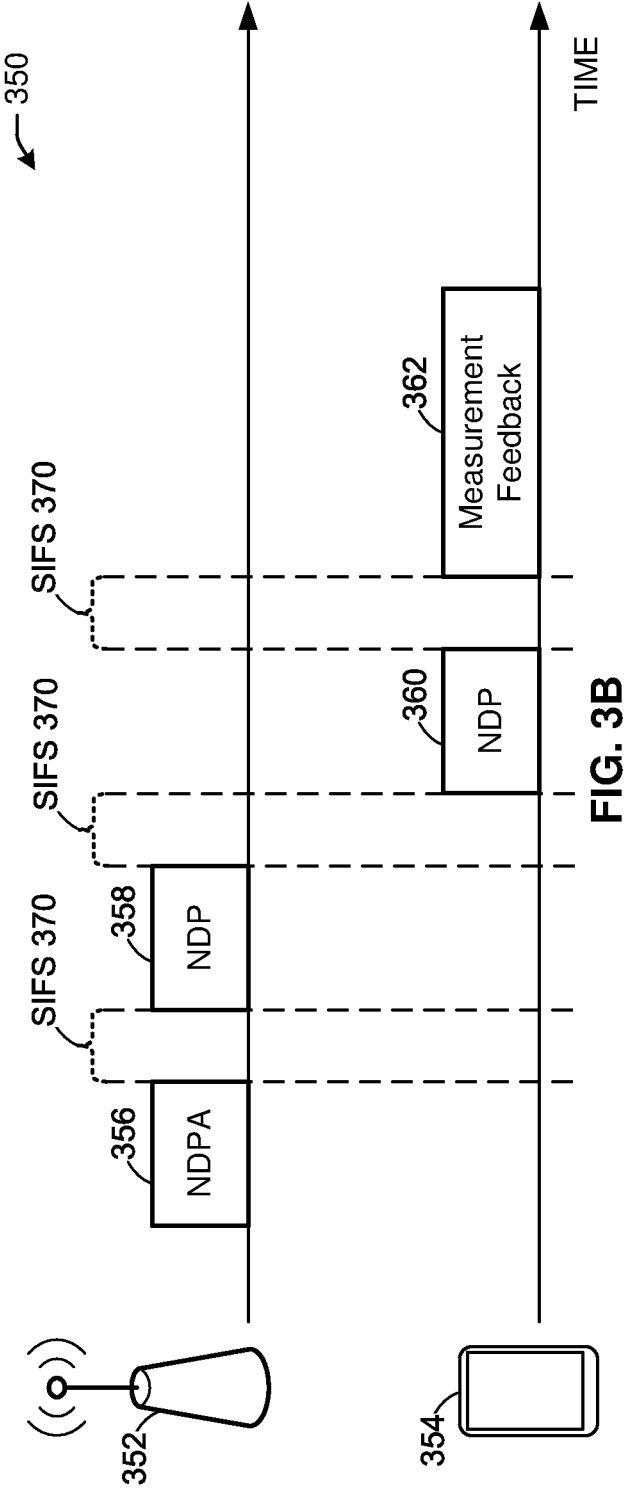
FIG. 3B depicts an illustrative single user measurement sequence, in accordance with one or more example embodiments of the present disclosure.

FIG. 3B depicts an illustrative SU measurement sequence 350, in accordance with one or more example embodiments of the present disclosure.

Referring to FIG. 3B, the SU measurement sequence 350 may include an initiator STA 352 and a responder STA 354. The initiator STA 352 may send an NDPA 356 to announce the transmission of a NDP 358, and after a SIFS 370 time of sending the NDPA 356, the initiator STA 352 may send the NDP 358. The responder STA 354 may send a NDP 360 after SIFS 370 time of receiving the NDP 358, and after SIFS 370 time of sending the NDP 360, the responder STA 354 may send measurement feedback 362 to the initiator STA 352. The measurement feedback 362 may include a time of arrival of the NDP 358 and a time of departure of the NDP 360 that the initiator STA 352 may use to measure a distance/range to the responder STA 354.

The NDP 358 may use the format of the HE sounding NDP 240 of FIG. 2B. The NDP 360 may use the format of the HE sounding NDP 240 of FIG. 2B, and may include a first bit (e.g., bit B0) set by the responder STA 354 to zero to indicate that the NDP 360 is a HE TB PPDU.

The SU measurement sequence 350 may be completed within a single TXOP. For example, after any frame is sent, a device may wait a time, such as SIFS 370, before sending another frame.

Figure 4A:
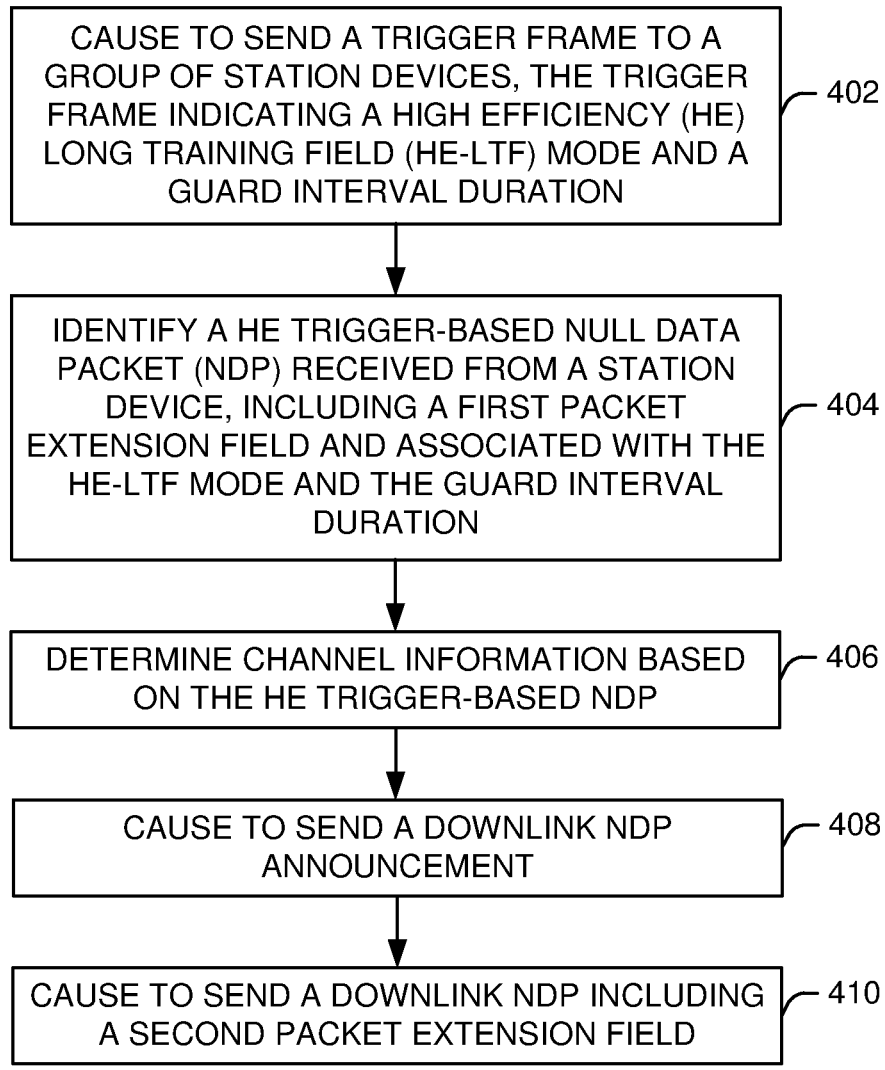
FIG. 4A depicts a flow diagram of illustrative process for channel sounding using a trigger-based NDP, in accordance with one or more embodiments of the disclosure.

FIG. 4A depicts a flow diagram of illustrative process 400 for channel sounding using a trigger-based NDP, in accordance with one or more example embodiments of the present disclosure.

At block 402, a device (e.g., the AP 102 of FIG. 1) may send a trigger frame to a group of station devices, the group of station devices including a first station device, the trigger frame including a first indication of a HE-LTF mode and a second indication of a guard interval duration. The HE-LTF mode may be a 2×HE-LTF mode or a 4×HE-LTF mode. The guard interval duration may be 0.8 microseconds, 1.6 microseconds, or 3.2 microseconds.

At block 404, the device may identify a HE TB NDP received from the first station device, the HE TB NDP including a first packet extension field, and the HE TB NDP being associated with the HE-LTF mode and the guard interval duration. The packet extension field may have a duration of 0, 4, 8, 12, 16, or another number of microseconds. The HE TB NDP may support a 2×HE-LTF mode or a 4×HE-LTF mode.

At block 406, the device may determine channel state information based on the HE TB NDP received from the first station device. Channel state information may be determined by a receiving device and sent to the transmitting device, and the devices may use the channel state information to derive the time of arrival of the corresponding HE TB NDP.

At block 408, the device may send a downlink NDPA frame. The NDPA frame may indicate that the device may send a NDP frame after a time, such as SIFS.

At block 410, the device may send a downlink NDP, wherein the downlink NDP includes a second packet extension field. The downlink NDP may be a HE sounding NDP, and may support a 2×HE-LTF mode or a 4×HE-LTF mode. The packet extension field of the downlink NDP may have a duration of 4 microseconds.

Figure 4B:
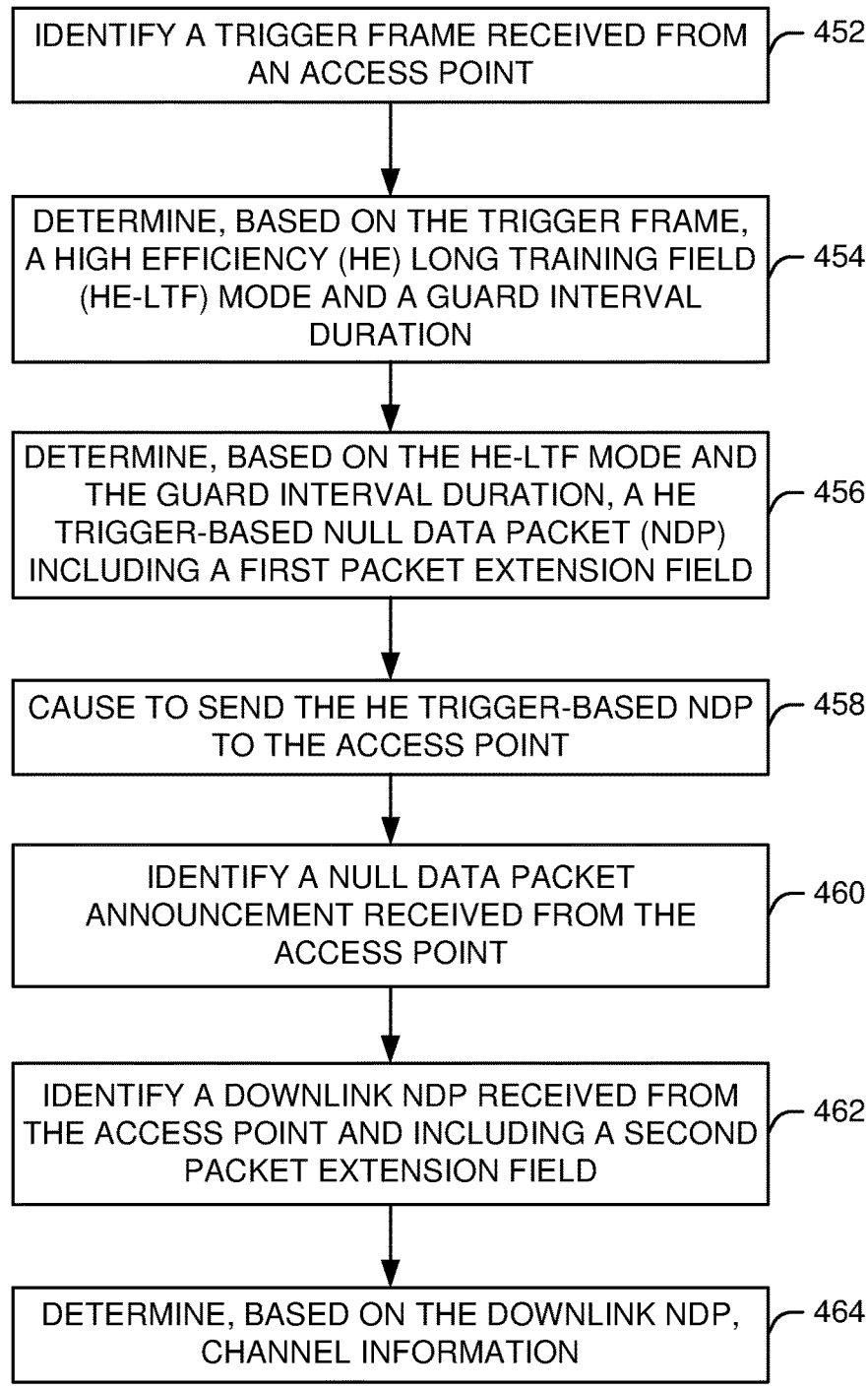
FIG. 4B depicts a flow diagram of illustrative process for channel sounding using a trigger-based NDP, in accordance with one or more embodiments of the disclosure.

FIG. 4B depicts a flow diagram of illustrative process 450 for channel sounding using a trigger-based NDP, in accordance with one or more example embodiments of the present disclosure.

At block 452, a device (e.g., the user device 120 of FIG. 1) may identify a trigger frame received from an AP (e.g., a responding device). The trigger frame may include a first indication of a HE-LTF mode and a second indication of a guard interval duration. The HE-LTF mode may be a 2×HE-LTF mode or a 4×HE-LTF mode. The guard interval duration may be 0.8 microseconds, 1.6 microseconds, or 3.2 microseconds.

At block 454, the device may determine, based on the trigger frame, a HE-LTF mode and a guard interval duration. For example, the HE-LTF mode may be a 2×HE-LTF mode with a guard interval duration of 0.8 microseconds or a guard interval duration of 1.6 microseconds. The HE-LTF mode may be a 4×HE-LTF mode with a guard interval duration of 3.2 microseconds.

At block 456, the device may determine, based on the HE-LTF mode and the guard interval duration, a HE TB NDP, the HE TB NDP including a first packet extension field. The packet extension field may have a duration of 0, 4, 8, 12, 16, or another number of microseconds. The packet extension field may support a 2×HE-LTF mode or a 4×HE-LTF mode.

At block 458, the device may send the HE TB NDP to the AP.

At block 460, the device may identify a downlink NDPA frame received from the AP. The NDPA frame may indicate that the AP may send a subsequent NDP frame.

At block 462, the device may identify a downlink NDP received from the AP, the downlink NDP including a second packet extension field. The packet extension field may have a duration of 4 microseconds. The downlink NDP may be a HE sounding NDP, and may support a 2×HE-LTF mode or a 4×HE-LTF mode.

At block 464, the device may determine, based on the downlink NDP, channel state information.

It is understood that the above descriptions are for purposes of illustration and are not meant to be limiting.

FIG. 5 shows a functional diagram of an exemplary communication station 500 in accordance with some embodiments. In one embodiment, FIG. 5 illustrates a functional block diagram of a communication station that may be suitable for use as an AP 102 (FIG. 1) or user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The transceiver 510 may be a device comprising both a transmitter and a receiver that are combined and share common circuitry (e.g., communication circuitry 502). The communication circuitry 502 may include amplifiers, filters, mixers, analog to digital and/or digital to analog converters. The transceiver 510 may transmit and receive analog or digital signals. The transceiver 510 may allow reception of signals during transmission periods. This mode is known as full-duplex, and may require the transmitter and receiver to operate on different frequencies to minimize interference between the transmitted signal and the received signal. The transceiver 510 may operate in a half-duplex mode, where the transceiver 510 may transmit or receive signals in one direction at a time.

The communications circuitry 502 may include circuitry that can operate the physical layer (PHY) communications and/or media access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in detailed in FIGS. 1-4.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), an enhanced channel sounding device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the enhanced channel sounding device 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The enhanced channel sounding device 619 may carry out or perform any of the operations and processes (e.g., process 400 of FIG. 4A, process 450 of FIG. 4B) described and shown above.

In one embodiment, the enhanced channel sounding device 619 may define an enhanced frame format for the UL NDP. The enhanced frame format is compatible with the NDP frame format in the current 802.11ax standard. In particular, the enhanced frame format may use a portion of a HE sounding NDP PPDU, but the parameter fields in the HE signature-A (HE-SIG-A) field of the HE sounding NDP PPDU may be set according to a format of a HE-SIG-A field of a HE TB PPDU. The enhanced frame format may use an entire channel or band like the HE sounding NDP PPDU, but modified for an uplink format partially based on the HE sounding NDP PPDU. The enhanced channel sounding device 619 may define a HE-LTF mode for a sounding NDP, may determine a range from another device based on a sounding frame, and may provide channel state information to another device.

It is understood that the above are only a subset of what the enhanced channel sounding device 619 may be configured to perform and that other functions included throughout this disclosure may also be performed by the enhanced channel sounding device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may be a device comprising memory and processing circuitry configured to: cause to send a trigger frame to a group of station devices, the group of station devices comprising a first station device, wherein the trigger frame comprises a first indication of a high efficiency (HE) long training field (HE-LTF) mode and a second indication of a guard interval duration; identify a HE trigger-based (TB) null data packet (NDP) received from the first station device, wherein the HE TB NDP comprises a first packet extension field, wherein the HE TB NDP is associated with the HE-LTF mode and the guard interval duration; determine channel information based on the HE TB NDP; and cause to send a downlink NDP, wherein the downlink NDP comprises a second packet extension field and is associated with the HE-LTF mode and the guard interval duration.

Example 2 may include the device of example 1 and/or some other example herein, wherein the HE-LTF mode is a 2×HE-LTF mode.

Example 3 may include the device of example 2 and/or some other example herein, wherein the guard interval duration is 0.8 microseconds.

Example 4 may include the device of example 2 and/or some other example herein, wherein the guard interval duration is 1.6 microseconds.

Example 5 may include the device of example 1 and/or some other example herein, wherein the first packet extension field is greater than zero.

Example 6 may include the device of example 1 and/or some other example herein, wherein the first packet extension field is 4 microseconds, wherein the HE TB NDP further comprises a first HE short training field (HE-STF), wherein the first HE-STF has a duration of 8 microseconds, wherein the downlink NDP comprises a second HE-STF, and wherein the second HE-STF has a duration of 4 microseconds.

Example 7 may include the device of example 1 and/or some other example herein, wherein the HE TB NDP comprises a set of fields, wherein the downlink NDP comprises the set of fields, wherein the first packet extension field is the same as the second packet extension field, wherein the set of fields comprises the first packet extension field and a HE signal-A (HE-SIG-A) field, wherein a first HE-SIG-A field of the HE TB NDP comprises first parameters, wherein a second HE-SIG-A field of the downlink NDP comprises second parameters, wherein the first parameters are different from the second parameters.

Example 8 may include the device of example 1 and/or some other example herein, further comprising a transceiver configured to transmit and receive wireless signals.

Example 9 may include the device of example 8 and/or some other example herein, further comprising one or more antennas coupled to the transceiver.

Example 10 may include a non-transitory computer-readable medium storing computer-executable instructions which when executed by one or more processors result in performing operations comprising: identifying a trigger frame received from a responding device; determining, based on the trigger frame, a high efficiency (HE) long training field (HE-LTF) mode and a guard interval duration; determining, based on the HE-LTF mode and the guard interval duration, a HE trigger-based (TB) null data packet (NDP), wherein the HE TB NDP comprises a first packet extension field; causing to send the HE TB NDP to the responding device; identifying a downlink NDP received from the responding device, wherein the downlink NDP comprises a second packet extension field; and determining, based on the downlink NDP, channel state information.

Example 11 may include the non-transitory computer-readable medium of example 10 and/or some other example herein, wherein the HE-LTF mode is a 2×HE-LTF mode.

Example 12 may include the non-transitory computer-readable medium of example 10 and/or some other example herein, wherein the guard interval duration is 0.8 microseconds.

Example 13 may include the non-transitory computer-readable medium of example 10 and/or some other example herein, wherein the guard interval duration is 1.6 microseconds.

Example 14 may include the non-transitory computer-readable medium of example 10 and/or some other example herein, wherein the first packet extension field is greater than zero.

Example 15 may include the non-transitory computer-readable medium of example 10 and/or some other example herein, wherein the first packet extension field has a duration of 4 microseconds, wherein the HE TB NDP further comprises a first HE short training field (HE-STF), wherein the first HE-STF has a duration of 8 microseconds, wherein the downlink NDP comprises a second HE-STF, and wherein the second HE-STF has a duration of 4 microseconds.

Example 16 may include the non-transitory computer-readable medium of example 10 and/or some other example herein, wherein the HE TB NDP comprises a set of fields, wherein the downlink NDP is a HE sounding NDP, wherein the downlink HE sounding NDP comprises the set of fields, wherein the first packet extension field is the same as the second packet extension field, wherein the set of fields comprises the first packet extension field and a HE signal-A (HE-SIG-A) field, wherein a first HE-SIG-A field of the HE TB NDP comprises first parameters, wherein a second HE-SIG-A field of the downlink HE sounding NDP comprises second parameters, wherein the first parameters are different from the second parameters.

Example 17 may include a method comprising: causing to send, by an initiator device, a null data packet announcement (NDPA) frame to a responder device; determining, by the initiator device, an uplink null data packet (NDP), wherein the uplink NDP comprises a first indication of a high efficiency (HE) long training field (HE-LTF) mode, a second indication of a guard interval duration, and a first packet extension field; causing to send, by the initiator device, the uplink NDP to the responder device; identifying, by the initiator device, an downlink NDP received from the responder device, wherein the downlink NDP comprises a second packet extension field and a HE signal-A1 (HE-SIG-A1) field, wherein the downlink NDP is associated with the HE-LTF mode and the guard interval duration indicated in the HE-SIG-A1 field; and determining, by the initiator device, channel state information based on the downlink NDP received from the responder device.

Example 18 may include the method of example 17 and/or some other example herein, wherein the uplink NDP is a first HE sounding NDP frame, and wherein the downlink NDP is a second HE sounding NDP frame.

Example 19 may include the method of example 17 and/or some other example herein, wherein the HE-LTF mode is a 2×HE-LTF mode.

Example, 20 may include the method of example 17 and/or some other example herein, wherein the guard interval duration is 0.8 microseconds or 1.6 microseconds, wherein the first packet extension field has a duration of 4 microseconds, wherein the second packet extension field has a duration of 4 microseconds, and wherein a first bit of the HE-SIG-A1 field of the downlink NDP is set to zero to indicate that the downlink NDP is a HE trigger-based data unit.

Example 21 may include an apparatus comprising means for: causing to send a null data packet announcement (NDPA) frame to a responder device; determining an uplink null data packet (NDP), wherein the uplink NDP comprises a first indication of a high efficiency (HE) long training field (HE-LTF) mode, a second indication of a guard interval duration, and a first packet extension field; causing to send the uplink NDP to the responder device; identifying an downlink NDP received from the responder device, wherein the downlink NDP comprises a second packet extension field and a HE signal-A1 (HE-SIG-A1) field, wherein the downlink NDP is associated with the HE-LTF mode and the guard interval duration indicated in the HE-SIG-A1 field; and determining channel state information based on the downlink NDP received from the responder device.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21 or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
transmit a ranging trigger frame to a group of initiating station devices (ISTAs) in a trigger based (TB) ranging exchange, wherein the ranging trigger frame is a trigger frame of subvariant sounding, wherein the ranging trigger frame allocates uplink resources to one or more ISTAs, and wherein a supported mode is a 2× high efficiency-long training field (2× HE-LTF) with a 1.6 µs Guard Interval (GI);
receive one or more initiator-to-responder null data packets (NDPs) (I2R NDPs), wherein the one or more I2R NDPs are sent by the one or more ISTAs participating in the exchange and each I2R NDP is associated with the 2× HE-LTF mode and the 1.6 µs GI;
transmit a ranging NDP announcement (NDPA) frame after a short interframe space (SIFS) time, wherein the ranging NDPA frame is used by the one or more ISTAs after receiving a last HE TB ranging NDP from the one or more ISTAs;
transmit one or more responder-to-initiator NDPs (R2I NDPs), wherein the one or more R2I NDPs are used by the one or more ISTAs participating in the exchange and each R2I NDPs is associated with the 2× HE-LTF mode and the 1.6 µs GI;
receive a measurement feedback from a first ISTA, wherein the measurement feedback includes a time of arrival of an R2I NDP of the one or more R2I NDPs and a time of departure of an I2R NDP of the one or more I2R NDPs, wherein the R2I NDP and the I2R NDP are used to measure a range to the first ISTA; and
determine channel information based on the received HE TB ranging NDPs and the measured ToF.

2. The device of claim 1, wherein the one or more R2I NDPs are downlink NDPs to the one or more ISTAs.

3. The device of claim 2, wherein the one or more R2I NDPs are followed by a measurement report frame sent to the one or more initiator devices.

4. The device of claim 2, wherein the one or more I2R NDPs and the one or more R2I NDPs utilize a HE trigger-based physical layer (PHY) convergence protocol data unit (PPDU) format without a data field.

5. The device of claim 1, wherein the one or more I2R NDPs and the one or more R2I NDPs include a legacy short training field (L-STF), a legacy long training field (L-LTF), a legacy signal field (L-SIG), a repeated legacy signal field (RL-SIG), a HE-SIG-A field, a HE short training field (HE-STF), one or more HE long training fields (HE-LTFs), and a packet extension (PE).

6. The device of claim 5, wherein the L-STF has a length of 8 µs, the L-LTF has a duration of 8 µs, the L-SIG has a duration of 4 µs, the RL-SIG has a duration of 4 µs, the HE-SIG-A field has a duration of 8 µs, and the HE-STF has a duration of 8 µs.

7. The device of claim 1, wherein the processing circuitry is further configured to utilize a packet extension (PE) field that is 4 µs in duration for the one or more I2R NDPs and the one or more R2I NDPs, with the PE field starting with a guard interval (GI).

8. A non-transitory computer-readable medium storing computer-executable instructions which when executed by one or more processors result in performing operations comprising:
transmitting a ranging trigger frame to a group of initiating station devices (ISTAs) in a trigger based (TB) ranging exchange, wherein the ranging trigger frame is a trigger frame of subvariant sounding, wherein the ranging trigger frame allocates uplink resources to one or more ISTAs, and wherein a supported mode is a 2× high efficiency-long training field (2× HE-LTF) with a 1.6 µs Guard Interval (GI);
receiving one or more initiator-to-responder null data packets (NDPs) (I2R NDPs), wherein the one or more I2R NDPs are sent by the one or more ISTAs participating in the exchange and each I2R NDP is associated with the 2× HE-LTF mode and the 1.6 µs GI;
transmitting a ranging NDP announcement (NDPA) frame after a short interframe space (SIFS) time, wherein the ranging NDPA frame is used by the one or more ISTAs after receiving a last HE TB ranging NDP from the one or more ISTAs;
transmitting one or more responder-to-initiator NDPs (R2I NDPs), wherein the one or more R2I NDPs are used by the one or more ISTAs participating in the exchange and each R2I NDPs is associated with the 2× HE-LTF mode and the 1.6 µs GI;
receiving a measurement feedback from a first ISTA, wherein the measurement feedback includes a time of arrival of an R2I NDP of the one or more R2I NDPs and a time of departure of an I2R NDP of the one or more I2R NDPs, wherein the R2I NDP and the I2R NDP are used to measure a range to the first ISTA; and
determining channel information based on the received HE TB ranging NDPs and the measured ToF.

9. The non-transitory computer-readable medium of claim 8, wherein the one or more R2I NDPs are downlink NDPs to the one or more ISTAs.

10. The non-transitory computer-readable medium of claim 9, wherein the one or more R2I NDPs are followed by a measurement report frame sent to the one or more initiator devices.

11. The non-transitory computer-readable medium of claim 9, wherein the one or more I2R NDPs and the one or more R2I NDPs utilize a HE trigger-based physical layer (PHY) convergence protocol data unit (PPDU) format without a data field.

12. The non-transitory computer-readable medium of claim 8, wherein the one or more I2R NDPs and the one or more R21 NDPs include a legacy short training field (L-STF), a legacy long training field (L-LTF), a legacy signal field (L-SIG), a repeated legacy signal field (RL-SIG), a HE-SIG-A field, a HE short training field (HE-STF), one or more HE long training fields (HE-LTFs), and a packet extension (PE).

13. The non-transitory computer-readable medium of claim 12, wherein the L-STF has a length of 8 µs, the L-LTF has a duration of 8 µs, the L-SIG has a duration of 4 µs, the RL-SIG has a duration of 4 µs, the HE-SIG-A field has a duration of 8 µs, and the HE-STF has a duration of 8 µs.

14. The non-transitory computer-readable medium of claim 8, wherein the operations further comprise utilizing a packet extension (PE) field that is 4 µs in duration for the one or more I2R NDPs and the one or more R2I NDPs, with the PE field starting with a guard interval (GI).

15. A method comprising:
transmitting a ranging trigger frame to a group of initiating station devices (ISTAs) in a trigger based (TB) ranging exchange, wherein the ranging trigger frame is a trigger frame of subvariant sounding, wherein the ranging trigger frame allocates uplink resources to one or more ISTAs, and wherein a supported mode is a 2x high efficiency-long training field (2x HE-LTF) with a 1.6 µs Guard Interval (GI);
receiving one or more initiator-to-responder null data packets (NDPs) (I2R NDPs), wherein the one or more I2R NDPs are sent by the one or more ISTAs participating in the exchange and each I2R NDP is associated with the 2x HE-LTF mode and the 1.6 µs GI;
transmitting a ranging NDP announcement (NDPA) frame after a short interframe space (SIFS) time, wherein the ranging NDPA frame is used by the one or more ISTAs after receiving a last HE TB ranging NDP from the one or more ISTAs;
transmitting one or more responder-to-initiator NDPs (R2I NDPs), wherein the one or more R2I NDPs are used by the one or more ISTAs participating in the exchange and each R2I NDPs is associated with the 2x HE-LTF mode and the 1.6 µs GI;
receiving a measurement feedback from a first ISTA, wherein the measurement feedback includes a time of arrival of an R2I NDP of the one or more R21 NDPs and a time of departure of an I2R NDP of the one or more I2R NDPs, wherein the R2I NDP and the I2R NDP are used to measure a range to the first ISTA; and
determining channel information based on the received HE TB ranging NDPs and the measured ToF.

16. The method of claim 15, wherein the one or more R2I NDPs are downlink NDPs to the one or more ISTAs.

17. The method of claim 16, wherein the one or more R2I NDPs are followed by a measurement report frame sent to the one or more initiator devices.

18. The method of claim 15, wherein the one or more I2R NDPs and the one or more R2I NDPs include a legacy short training field (L-STF), a legacy long training field (L-LTF), a legacy signal field (L-SIG), a repeated legacy signal field (RL-SIG), a HE-SIG-A field, a HE short training field (HE-STF), one or more HE long training fields (HE-LTFs), and a packet extension (PE).

\* \* \* \* \*